United States Patent [19]

Charlat et al.

[11] 4,331,223
[45] May 25, 1982

[54] ELECTROHYDRAULIC ROTARY BRAKE

[75] Inventors: Patrice Charlat, Mantes la Ville; Bernard Delmas, Clichy; Jose Mallen-Herrero, Paris, all of France

[73] Assignee: Compagnie de Construction Mecanique Sulzer, France

[21] Appl. No.: 140,946

[22] Filed: Apr. 16, 1980

[30] Foreign Application Priority Data

Apr. 20, 1979 [FR] France ............................. 79 09998

[51] Int. Cl.³ .............................................. F16D 57/02
[52] U.S. Cl. ................................... 188/294; 188/307; 192/58 R; 418/158
[58] Field of Search ....................... 188/293, 294, 307; 192/58 R; 418/23, 158

[56] References Cited

U.S. PATENT DOCUMENTS

| | | |
|---|---|---|
| 1,850,693 | 3/1932 | Sappington . |
| 2,512,248 | 6/1950 | Gassot ................................. 188/294 |
| 2,588,342 | 3/1952 | Bidwell ........................... 418/158 X |
| 2,952,249 | 9/1960 | Conover, Jr. .................... 418/158 X |
| 4,006,804 | 2/1977 | Fehr ..................................... 188/293 |
| 4,132,512 | 1/1979 | Roberts ........................... 418/158 X |

FOREIGN PATENT DOCUMENTS

| | | |
|---|---|---|
| 1964564 | 2/1971 | Fed. Rep. of Germany . |
| 2136158 | 2/1973 | Fed. Rep. of Germany . |
| 1317809 | 1/1963 | France . |
| 492585 | 8/1970 | Switzerland . |
| 584095 | 12/1977 | U.S.S.R. ............................. 418/158 |

*Primary Examiner*—George E. A. Halvosa
*Attorney, Agent, or Firm*—Karl W. Flocks & Associates

[57] ABSTRACT

An electrohydraulic rotary brake comprises an inner core, at least one energizing winding, a cylindrical amagnetic insert and an annular part outside the core and the insert. A cylindrical bore is excentric with respect to the cylindrical peripheral surface of the insert, recesses being provided with magnetizable sliding vanes and a brake fluid. On a rotary shaft, are mounted lateral flanges in fluid-tight manner, the inner core being fast to the rotary shaft and to the insert, all three being arranged so as to constitute a rotor for the brake. The annular part outside the core and the insert constitutes an annular stator to which the lateral flanges are fixed and with the bore excentric with respect to the peripheral surface of the insert constituting the outer part of the rotor. The recesses are formed in the cylindrical amagnetic insert and extend radially therein on both sides so that the vanes are movable between a position of complete freedom of the rotor with respect to the annular stator, in which they are positioned close to the rotor core, and a braking position in which they are positioned close to said annular stator, so that, under the effect of a variation in a pre-determined sense of the current passing through the energizing winding, the vanes can be attracted towards said stator and thus define peripheral chambers of different volumes which, by the forced passage of respective volumes of fluid from one chamber to the other, cause between the vanes and the stator a severe throttling and thus the braking torque of the rotor.

14 Claims, 6 Drawing Figures

ELECTROHYDRAULIC ROTARY BRAKE

BACKGROUND OF THE INVENTION

1. Field of the Invention

The present invention relates to electrohydraulic rotary brakes comprising notably an inner core, at least one energizing winding, a cylindrical amagnetic insert, an annular part outside the core and the insert and including a cylindrical bore excentric with respect to the cylindrical peripheral surface of the insert, recesses provided with magnetisable sliding vanes and a brake fluid.

2. Description of the Prior Art

In this type of brake constituted in a way by a volumetric vane pump, entirely or partly filled with a fluid preferably incompressable, the vanes, fast to the rotary member, are actuatable radially whilst being guided in their respective recesses. Thus, at the moment when braking must take place, a variation in current in the energizing winding acts successively during one revolution on all the vanes to bring them to partition the cylindrical bore of the annular part excentric with respect to the insert. In a way, the vanes define peripheral chambers of different volumes. The forced passage of fluid, causing an intense throttling of fluid between the vanes and the fixed members of the pump, is the source of the braking torque which the device must develop.

According to a known construction, the inner core, immobile in rotation and axially, is a magnetic material and includes a circular peripheral cavity in which the toric energizing winding is housed, the whole being enveloped by the cylindrical amagnetic insert and constituting the fixed or stator member. The outer annular part constitutes the rotary member, or rotor, fast to the body to be braked, and it is this which includes the recesses provided with magnetisable sliding vanes. When no braking action is desired, no current is supplied to the energizing winding, and the vanes are held in the annular rotor, remote from the stator, under the action of centrifugal force. When braking is desired, the current is established in the energizing winding, and the vanes are thus attracted to the stator which causes the partitioning of the cylindrical bore mentioned above and consequently braking, provided that the intensity of the electrical current is sufficient to overcome the different forces which are opposed to the movement of the vanes in this direction. The larger or smaller amount of throttling is determined by the force of application of the vanes to the stator, depending on the energizing current passing in the electromagnetic field winding.

However, cases exist where difficulties of a technological type occur when it is desired to form the inner part of the brake in the shape of an amagnetic cylindrical rotor arranged annularly and fast to the mass to be braked. There are also cases where it is desirable for the braking to be effected by suppression of the energizing current and not by the establishment of the current (for safety reasons, for example).

It is an object of the invention to overcome one or more of these difficulties. Other objects of the invention will appear from the description which follows.

GENERAL DESCRIPTION OF THE INVENTION

Accordingly, the present invention relates to an electrohydraulic rotary brake comprising an inner core, at least one energizing winding, a cylindrical amagnetic insert, an annular part outside the core and the insert and including a cylindrical bore excentric with respect to the cylindrical peripheral surface of the insert, recesses provided with magnetisable sliding vanes and a brake fluid, said electrohydraulic rotary brake being characterised in that the inner core is fast to a rotary shaft and to the insert, all three arranged in order to constitute a rotor for the brake, the annular part outside the core and the insert constituting an annular stator with a bore excentric with respect to the peripheral surface of the insert constituting the outer part of the rotor and with lateral flanges mounted in fluid-tight manner on the shaft, on both sides of said rotor, and in that the recesses provided with vanes are formed in the cylindrical amagnetic insert and extend therein radially on both sides in order that the sliding vanes may be movable between a position of total freedom of the rotor with respect to the annular stator in which they are positioned close to the rotor core and a braking position in which they are positioned close to the annular stator, so that, under the effect of a variation in a pre-determined direction of the current passing through the energizing winding, the vanes can be attracted to the stator and thus determine peripheral chambers of different volumes which, by forced passage of respctive volumes of fluid from one chamber to the other, cause between the vanes and the stator an intense throttling and thus the braking torque of the rotor; this construction thus enables the rotor to be made fast to the mass to be braked.

In a particular embodiment of the invention, the outer annular part constituting the stator is at least partly of amagnetic material and includes cavities extending in the direction of the longitudinal axis of the rotor, said cavities being provided with permanent magnets in the region of the cylindrical bore. In addition, the core, at least partly of amagnetic material, includes a circular peripheral cavity in which a toric energizing winding is housed. Then, the energizing winding is connected to an electrical supply by an electrical connection means such as a rotary collector, so that it can be supplied electrically in order to enable the rotation of the rotor and so that the reduction of the current which passes through said winding results, from a certain value, in the movement of the vanes towards the permanent magnets, in order to cause braking. As a result a complete suppression of the energizing current results in extremely effective braking.

Other characteristics and advantages of the invention will emerge from the description which follows given with reference to the accompanying drawings.

DESCRIPTION OF PREFERRED EMBODIMENTS

Figure 1:
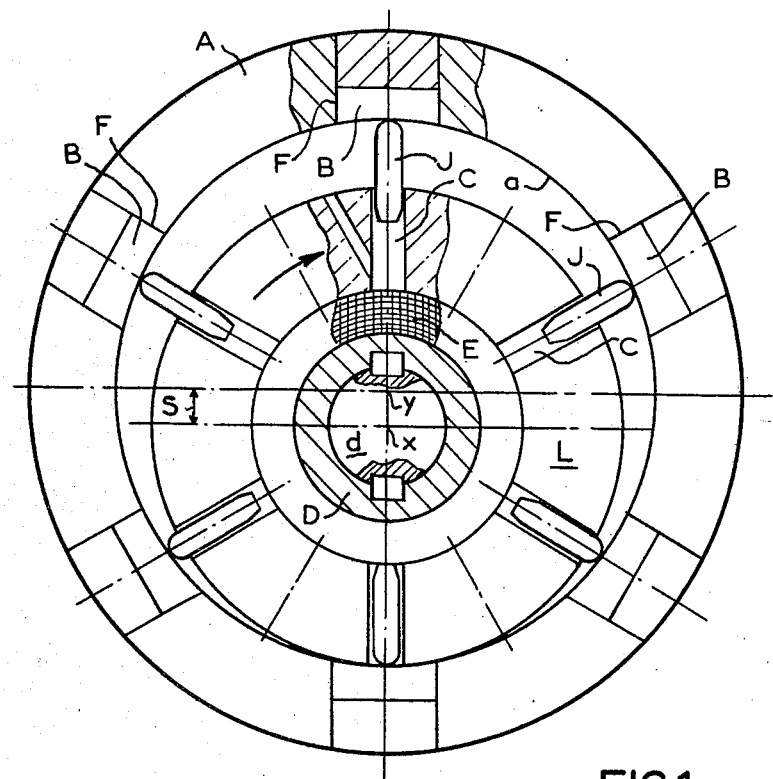
FIG. 1 is a cross section of a first embodiment of a brake according to the invention, sectioned along the line I—I of FIG. 2.

In the three embodiments, a shaft d with a longitudinal axis x, movable in rotation because it is fast to a mass to be braked itself rotatable, is concentrically made fast to the core D, for example, keyed to the latter.

This core D may be formed in various ways according to the requirements dependent on the functions to be performed by the brake, as will be seen below in the description specific to each of the embodiments given by way of example. In the three cases, the inner core D is surrounded by an insert L at least partially of amagnetic material, in the form of a cylindrical ring. This insert L includes a certain number of recesses C, in the form of notches extending into the insert radially from side to side, angularly spaced regularly, for example, six in number. Inside these recesses, sliding vanes J are inserted, at least partially of magnetisable material, movable between a "retracted" position, wherein they are entirely contained in the recesses C, immediately close to the core D, and a "extended" position wherein they are almost entirely outside the recesses C, the portion remaining in the recess serving for guidance.

An annular part A constitutes a stator around the assembly constituted by the shaft (d), the inner core (D) and the insert (L) forming a rotor. The annular part A, of a good heat conducting material, includes a cylindrical bore a; its axis y is excentric by an amount S with respect to the axis x of the shaft d. The annular stator A is positioned with respect to the shaft d by two lateral flanges M and Q of amagnetic material which is a good conductor of heat fixed in fluid-tight manner to the stator, for example, by brace rods not shown in the drawings but whose location is marked by axes bearing the reference mark P in FIGS. 2, 4 and 6. These flanges M and Q are mounted in fluid-tight manner on the shaft d, suitable means being provided to enable, undergood conditions, the rotation of this shaft inspite of the immobility of the stator A.

A certain amount of a fluid whose viscosity varies little with temperature fills the space left empty between the bore a of the annular stator A and the at least partially amagnetic insert L.

The dimensions of the adjustments of the various parts enable the free rotation of the assembly constituted by the shaft d, the core D and the insert L, forming a rotor, inside the flanges M, Q fast to the annular part A forming a stator, but only leave narrow passage sections along the flat faces, in order that leakages may be minimal.

As a result of this construction, if the shaft d is rotated by the movement of a mass to be braked fast to it, the vanes J being held in retracted position, no braking torque is applied to it. On the other hand, if the vanes J are subjected to a force tending to extend them from their recess C, they effect, in the course of a rotation of the rotor, a complete to and fro movement, passing from a "retracted" position where they are entirely contained in their recess to an "emerged" position where they are almost entirely outside of their recess, and returning to their "retracted" position, the position of each vane J in its recess C being defined by the distance of the wall of the bore a to the peripheral wall of the insert L, (the maximum travel of the vanes being consequently equal to double the eccentricity S, with a minimum air gap existing between the annular part A and the insert L); also, the vanes in "out" position define peripheral chambers of different volumes, and the forced passage of the fluid, causing an extremely throttled flow between the vanes and the stator, is the source of a braking torque. For purpose of simplification, it may be said that the position of the vanes in immediate proximity to the core corresponds to complete freedom of the rotor with respect to the stator and that their position in immediate proximity to the stator corresponds to the braking position, although there exists a position wherein the vanes are both in immediate proximity to the core and to the stator (within the distance of the air gap), whether being braked or not.

Advantageously, the control of the position of the vanes may be effected electromagnetically, by means of one (or several) energizing winding(s) respectively fast to the rotor and (/or) of the stator, each winding being itself comprised of from several parts connected in series or in parallel, for example for safety reasons.

Figure 2:
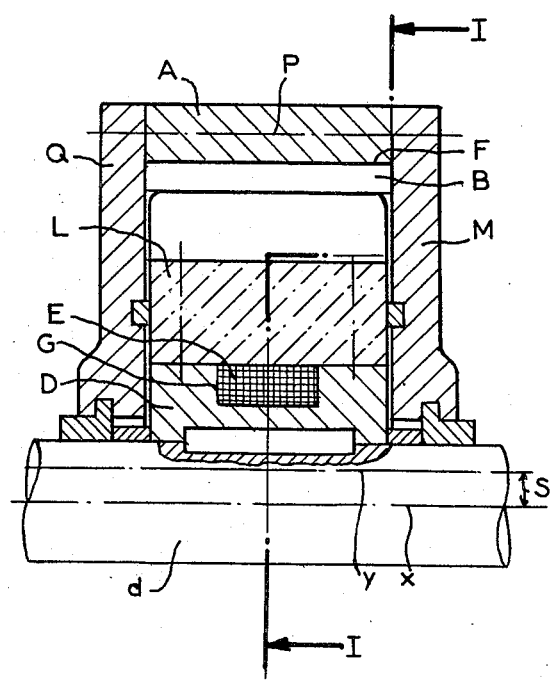
FIG. 2 is a longitudinal half-section of the brake shown in FIG. 1.

The first embodiment, shown in FIGS. 1 and 2, shows an energizing winding E, here approximately in the form of a torus, housed in a circular peripheral cavity G hollowed in the core D at least partially of magnetic material, so that the periphery of the torus becomes flush with the lateral surface of the core D. The stator A, of amagnetic material (at least partially) has its cylindrical bore a lined with permanent magnets B housed in cavities F formed in said bore a, here over the length of the latter, the magnets B, for example equal in number to the vanes J, becoming flush with the wall of the bore a so that the vanes J have no discontinuity to pass through on their rotation. It is also possible to provide, instead of the flush arrangements, for the cavities to be closed on the side of the vanes by the presence of a slight thickness of a material. Preferably, the permanent magnets B and their cavities F are also positioned with respect to the same centre as the core D and the vanes J, that is to say the longitudinal axis of the rotor.

The energizing winding, being fast to a rotary part, must be supplied electrically through a device such as a rotary collector or the like (not shown).

When the shaft d is in rotation, the winding E being supplied by an energizing current i (d.c.) the vanes J remain at the bottom of their housing C in the insert L, if the electromagnetic force generated by the winding E (function of i) if greater than the sum of the centrifugal force and the magnetic original force created by the permanent magnets B. The rotation is carried out then without difficulty.

At a desired moment, for braking, the stopping of the supply to the winding E ($i=0$) cancels the force exerted on the vanes J and destroys the equilibrium of the forces which resulted therefrom. The centrifugal force and the effect of the permanent magnets B then become preponderant, the vanes J emerge from their housings to come into contact with the stator A, and a braking force is created by throttling of the fluid under the vanes.

If the complete stop is not desired, it is possible to control the braking force by reducing only the value of the current i, which enables an electromagnetic return force to be preserved, causing less extreme throttling of the fluid and consequently a smaller braking force. It is also possible to preserve for a given load a constant braking force, enabling reduction in the speed from an initial value $v_1$ and its stabilization at a value $v_2$.

It is seen that, to rotate the shaft d, it is necessary for the vanes J to be at the bottom of their housing, hence for the winding E is sufficiently energised; to keep the shaft d stopped, for a given load, it suffces not to energize the winding E, the vanes then being attracted by the permanent magnets until contact with the stator A; operation as a safety member is then produced.

This embodiment enables the production automatically of braking on electrical supply breakdown (by a break in the supply wires of the coil, for example, or for any other reason).

Figure 3:
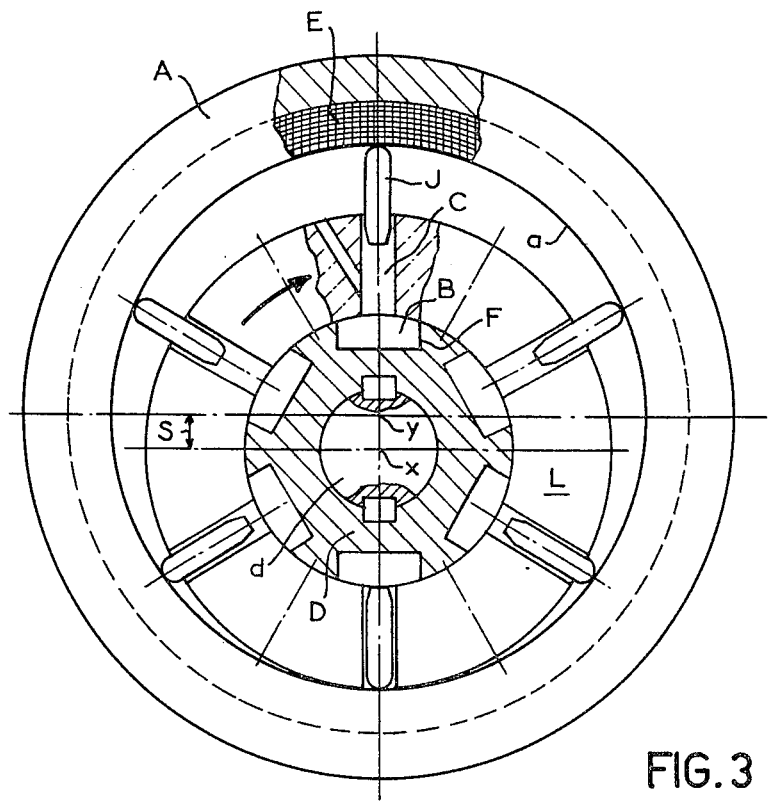
FIG. 3 is a cross section of a second embodiment of the brake according to the invention, cut along the line III—III of FIG. 4.
Figure 4:
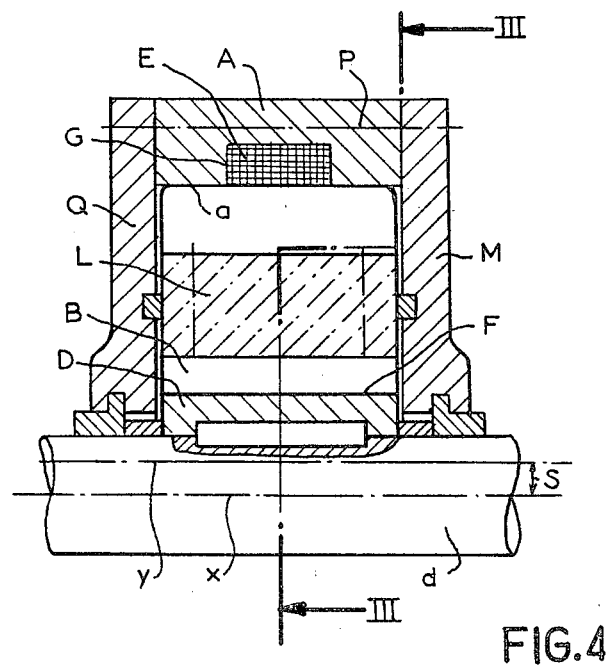
FIG. 4 is a longitudinal half-section of the brake shown in FIG. 3.

The second embodiment, shown in FIGS. 3 and 4, shows an energizing winding E, here also approximately in the form of a torus, housed in a circular peripheral cavity G hollowed in the bore a of the annular part A constituting the stator, so that the periphery of the torus (if necessary protected from friction by any suitable means) becomes flush with the wall of this bore; the stator A is this time at least partially of magnetic material, in order to close the magnetic field created by the winding E through the vanes J. Permanent magnets B are, this time, housed in cavities F formed in the shape of longitudinal grooves provided in the core D here over the whole length of the latter; the core D may be here partially magnetic or amagnetic.

This time, in order that the shaft d may rotate, it is necessary for the winding E to be without or with only slight energization; nonetheless, it is necessary for the force of the permanent magnets B on each vane J to be sufficient to balance the centrifugal force and to keep the vanes at the bottom of their housing. At the moment when braking is desired, the supply of the winding E interrupts this balance and creates a severe throttling of fluid under the vane, causing the stopping of the rotation of the shaft d. In the case of controlled braking at a given speed, control is achieved by supplying the winding E by a more or less intense current, the new balancing of the forces on the vanes J generating a throttling itself more or less severe between the vanes and the stator, causing a reduction in the speed of rotation of the shaft d. The maintenance of the energizing current in the winding E at its maximum intensity enables, by contact of the vanes and of the stator, the shaft d to be kept at zero speed, the maximum braking force being achieved through the impossibility of leakage between chambers.

The second embodiment has the advantage of not requiring the presence of a rotary collector.

Figure 5:
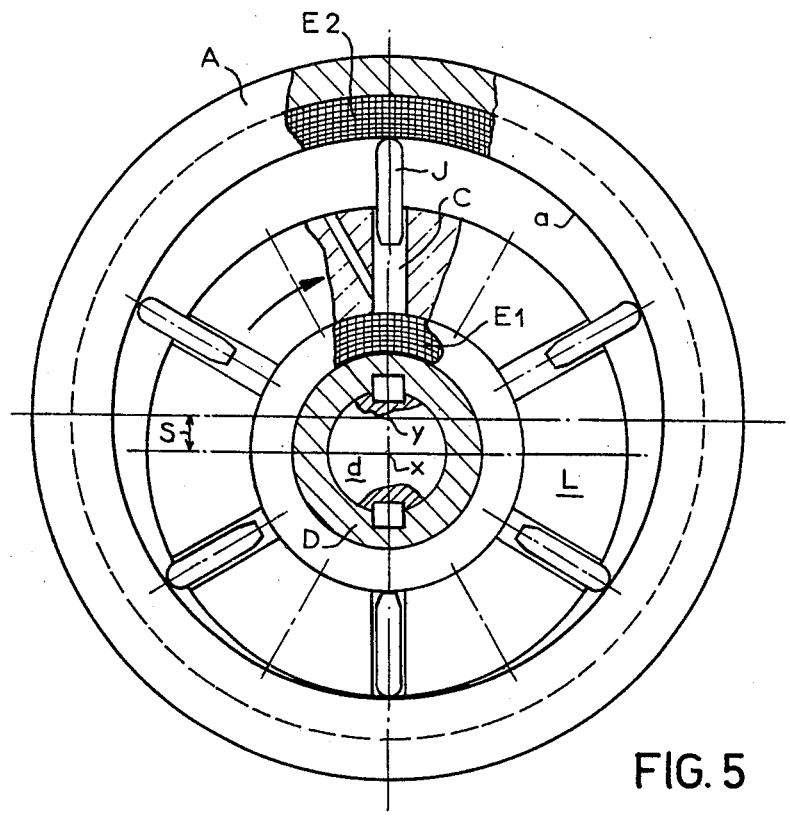
FIG. 5 is a cross section of a third embodiment of the brake according to the invention, cut along the line V—V of FIG. 6.
Figure 6:
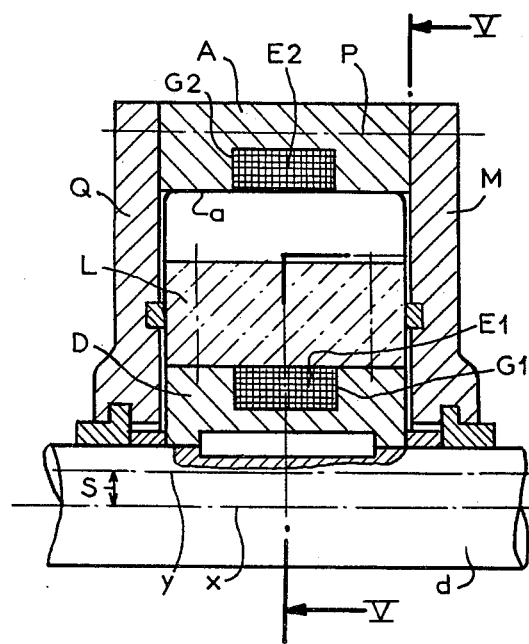
FIG. 6 is a longitudinal half-section of the brake shown in FIG. 5.

The third embodiment, shown in FIGS. 5 and 6, results from both the first and the second. Here, the core D, at least partially of magnetic material, includes a peripheral cavity G1 provided with an energizing winding E1 in the same arrangement as in the first embodiment, which necessitates consequently also the presence of a rotary collector or the like; however the annular part A is also at least partially of magnetic material and includes a circular peripheral cavity G2 provided with an energizing winding E2 in the same arrangement as in the second embodiment.

In order that the shaft d may rotate, it is necessary for the winding E1 to be sufficiently supplied to balance the centrifugal force due to the mass of the vanes J. To obtain braking, it is necessary to destroy the preceding equilibrium by supplying the winding E2 (or by reducing the current in the winding E1), which enables a braking force to be created, possibly maximum through the considerable throttling of the fluid. The simultaneous supply of the winding E1 and E2 enables the metering or the modulation of the force created on the vane J, hence a greater or lesser throttling of the fluid to be caused under the vane; this metering or this modulation can enable the holding of the shaft d, for a given load, at a pre-determined speed. The supply of the winding E2 along enables the contact of the vanes J against the stator A, resulting in the holding of the shaft d stationary.

Of course, the invention is not limited to the embodiments described and shown above, from which it would be possible to provide other embodiments without however departing from the scope of the invention defined in the appended claims; it will be possible for example to replace the permanent magnets housed in the cavities of the annular part or of the core by a permanent magnet itself forming a ring in a single part or a plurality of parts. It will also be possible to obtain the eccentricity of the cylindrical bore a of the annular part A with respect to the peripheral surface of the insert L, not, as in the three embodiments described, by offsetting the longitudinal axis y of said annular part A with respect to the longitudinal axis x of the shaft d, but by selecting the same longitudinal axis for these two parts and by making eccentric with respect to them at least one of the parts which rotates with the shaft d, for example the inner core D and/or the insert L.

We claim:

1. An electromagnetically actuatable rotary brake comprising a rotor having an inner core fixed for rotation with a rotary shaft to be braked and with a nonmagnetic cylindrical insert disposed radially outwardly of said core, and an annular stator defining a cylindrical bore around said rotor for containing brake fluid, lateral flanges disposed beyond opposite ends of said rotor defining ends of said cylindrical bore and mounted in fluidtight relation on the rotary shaft, said rotor being arranged eccentrically inside said cylindrical bore for rotation therein, vanes of magnetizable material slidably mounted in radial recesses in said cylindrical insert between a normal retracted, non-braking position and a fully extended braking position, first magnetic field means provided on said rotor for normally attracting said vanes to their retracted position against the action of centrifugal force exerted on said vanes in rotation, and second magnetic field means provided on said stator for attracting said vanes to said braking position, a selected on of said first and second magnetic means comprising electromagnetic coil means whereby in response to a change in current supplied to said electromagnetic coil means said vanes in their normal position are displaced toward a desired position between said retracted position and said fully extended position.

2. A brake according to claim 1, wherein the non-selected one of said first and second magnetic field means comprises other electromagnetic coil means.

3. A brake according to claim 2, wherein said first mentioned electromagnetic coil means is normally energized to maintain said vanes in said retracted position against a combination of centrifugal force and any magnetic field produced by said second mentioned electromagnetic coil means whereby in response to an increase of current supplied to said second mentioned electromagnetic coil means said vanes are displaced toward said stator.

4. A brake according to claim 2, wherein said core and said stator are both at least partially made of magnetic material.

5. A brake according to claim 1, wherein said first magnetic field means is said selected magnetic field means comprising said electromagnetic coil means, said electromagnetic coil means being normally energized to maintain said vanes in said retracted position against a combination of centrifugal force on said vanes and a magnetic field produced by said second magnetic field means whereby in response to the cutting off or failure of current supplied to said electromagnetic coil means said vanes are automatically displaced toward said stator to brake the rotary shaft.

6. A brake according to claim 1, wherein said second magnetic field means comprises permanent magnet means.

7. A brake according to claim 6, wherein said permanent magnet means lies flush with said cylindrical bore of said stator.

8. A brake according to claim 1, wherein said first magnetic field means is said selected magnetic field means comprising said electromagnetic coil means, said electromagnetic coil means being normally energized to maintain said vanes in said retracted position against a combination of centrifugal force and a magnetic field produced by said second magnetic field whereby in response to a decrease in current supplied to said electromagnetic coil means said vanes are displaced toward said stator.

9. A brake according to claim 1, wherein said selected magnetic field means comprises said second magnetic field means and said first magnetic field means comprises permanent magnet means.

10. A brake according to claim 9, wherein said core is at least partially made of nonmagnetic material and said stator at least partially made of magnetic material.

11. A brake according to claim 1, wherein said core is at least partially made of magnetic material and said stator is made at least partially of nonmagnetic material.

12. A brake according to claim 1, wherein said cylindrical insert is arranged concentrically on said rotary shaft.

13. A brake according to claim 1, wherein said insert is arranged eccentrically to said stator.

14. A brake according to claim 1, wherein said electromagnetic coil means comprises a toric coil.

* * * * *